(12) United States Patent
Huang et al.

(10) Patent No.: US 7,806,958 B2
(45) Date of Patent: *Oct. 5, 2010

(54) PLANT NUTRITION FORMULATED BY RECOVERY FILTRATE FROM PLANT FIBER BIOPULP AND METHOD THEREOF

(75) Inventors: Jenn Wen Huang, Taiping (TW); Yu Hsiang Peng, Taipei (TW)

(73) Assignee: Yuen Foong Yu Paper Mfg Co. Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/425,678

(22) Filed: Apr. 17, 2009

(65) Prior Publication Data

US 2009/0249847 A1    Oct. 8, 2009

Related U.S. Application Data

(62) Division of application No. 10/783,912, filed on Feb. 20, 2004, now Pat. No. 7,537,635.

(30) Foreign Application Priority Data

Mar. 6, 2003    (TW)    ............... 92104869 A

(51) Int. Cl.
C05F 11/00    (2006.01)
C05C 9/00    (2006.01)

(52) U.S. Cl. ............... 71/23; 71/28; 71/64.1

(58) Field of Classification Search ............... 71/23, 71/28, 64.1
See application file for complete search history.

(56) References Cited

U.S. PATENT DOCUMENTS 4,259,147 A    3/1981    Gordy
4,632,692 A    12/1986    Lebesgue et al.
6,217,628 B1    4/2001    Yagihashi et al.

FOREIGN PATENT DOCUMENTS

GB    2150552    7/1985

*Primary Examiner*—Wayne Langel
(74) *Attorney, Agent, or Firm*—Volpe and Koenig, P.C.

(57)    ABSTRACT

The present invention relates to a plant nutrition formulation and method thereof, and more particularly to a plant nutrition formulated by recovery filtrate from non-woody fiber plant biopulping and method thereof. The present invention provides a plant nutrition formulation including steps of providing a culture solution containing a culture medium, a non-woody fiber plant material and microbial suspension, fermenting the culture solution for preparing a biopulping solution, filtrating the biopulping solution for preparing a filtrate, and formulating the filtrate for preparing a plant nutrition.

5 Claims, 7 Drawing Sheets

Near view

Treatment                                      Control

Distant view

PLANT NUTRITION FORMULATED BY RECOVERY FILTRATE FROM PLANT FIBER BIOPULP AND METHOD THEREOF

FIELD OF THE INVENTION

The present invention relates to a plant nutrition, and more particularly to a plant nutrition formulated by recovery filtrate from non-woody fiber plant biopulp and formulating method thereof.

BACKGROUND OF THE INVENTION

Traditionally, farmers apply agricultural chemicals to prevent crops from being infected by the pathogens, which will increase the yield of the crops and reduce the possibility of plant disease infection. When the agricultural chemicals are utilized in a high concentration or in the late harvest period, the residue of agricultural chemicals left on the crops will be resulted in. An acute poison will cause damage on the human health by accumulating high concentration of the agricultural chemical in the body.

The present invention uses the recovery filtrate from non-woody fiber plant biopulp to formulate a plant nutrition for the crop cultivation. The rice straws, sugarcane residues and woods have been used as the materials for producing the paper pulp by chemical methods in the past. The waste water discharged from the papermaking factories is the major pollution source of the papermaking industry. This is a troublesome problem that is unable to be solved all the time. The present invention uses a biopulping method to produce the pulp fiber for papermaking. The recovery filtrate from the biopulp is not harmful to the germinations of the crop seeds and can be formulated to a plant nutrition solution. This plant nutrition is contributive to the crop development. Therefore, the present invention not only solves the environmental pollution problem but also provides a way for the resources recycling. This is a great achievement and breakthrough for the traditional chemical pulping processes.

The yield of rice straws is about 2.35 million tons every year in Taiwan. The organic components in rice straws are almost more than 95%. The organic components include 41.3% carbon, 0.81% nitrogen, 20.6% hemicellulose, 24.7% cellulose and 7.7% lignin. Generally, the ways for handling the waste rice straws include manufacturing them into straw ropes, straw bags, straw mats and cardboards, serving them as covering material for a plot of land, using them as a fuel, and mixing them with other materials to produce compost. Also, the rice straws could be directly buried in soil or burned for recyclably using the nutrition. Most of the waste rice straws are locally burned or directly buried in soil in modern society since the cost for manufacturing the rice straws into bags or mats is pretty high. When the waste rice straws are locally burned by the farmers, it not only easily results in the environmental pollution but also wastes the useful resources. Since the rice straws include abundant fibers, the soil fertility can be largely improved if the waste rice straws are buried in soil. However, the waste rice straws are usually not completely decomposed by the microorganisms under anaerobic environment, which results in the generation of organic acids such as acetic acid and phenolic acid, and etc. Nevertheless, these matters are harmful to the crop growth. The present invention provides a method that the waste rice straws are inoculated with the microorganisms under aerobic condition for fermentation and producing the biopulp and then the recovery biopulp filtrate is processed and manufactured into the product helpful to the crop development. In such a way, the waste would not cause environmental pollution.

Another aspect, character and executive adduction of the present invention will become more completely comprehensible by the following revelation and accompanying claim.

SUMMARY OF THE INVENTION

It is therefore an object of the present invention to provide a plant nutrition and formulating method thereof, and more particularly, a plant nutrition formulated by recovery filtrate from non-woody fiber plant biopulp and the formulating method thereof. The plant nutrition is helpful to the germination and enhances the growth of the plants.

It is an object of the present invention to provide a plant nutrition and method thereof. The present invention not only solves the environmental pollution problem but also provides a way for the resources recycling. This is a great achievement and breakthrough for the traditional chemical pulping processes.

In accordance with an aspect of the present invention, a method for formulating a plant nutrition is provided. The method includes steps of providing a biopulp of a non-woody fiber plant, filtrating the biopulp for preparing a filtrate and formulating the filtrate for preparing the plant nutrition.

Preferably, the biopulp is provided by steps of providing a culture solution with a culture medium, a non-woody fiber plant and a suspension of a microorganism, and fermenting the culture solution for preparing the biopulp.

Preferably, the non-woody fiber plant is pretreated by one selected from a group consisting of a relatively higher pressure treatment under a relatively higher temperature, a steamed treatment under a relatively higher temperature, a boiled treatment under a relatively higher temperature, a fumigatory treatment and a soaked treatment under a room temperature.

Preferably, the microorganism is one selected from a group consisting of a *Bacillus licheniformis* (PMBP-m5), a *Bacillus subtilis* (PMBP-m6) and a *Bacillus amyloliquefaciens* (PMBP-m7).

Preferably, the microorganism has an inoculation concentration ranged from 0 to 108 cfu/ml.

Preferably, the fermenting process is proceeded at a temperature ranged from 20 to 50° C.

Preferably, the fermenting process is proceeded over 0~10 days.

Preferably, the step of fermenting the culture solution for preparing the biopulp further includes a step of boiling the biopulp for 25~40 minutes under 120~150° C.

Preferably, the biopulp further includes 0~4% (w/v) CaO when being boiled.

Preferably, the biopulp is screened by 18~300 meshes.

Preferably, the filtrate is diluted by a volume of 10~100 times for being applied to a crop cultivation.

Preferably, the method further includes a step of adding an additive for preparing an improved plant nutrition, wherein the additive is one selected from a group consisting of a seaweed powder, an urea, an alcohol, a Hoagland's solution and a mixture thereof.

Preferably, the improved plant nutrition is diluted by a volume of 250~1000 times for being applied to a crop cultivation.

In accordance with another aspect of the present invention, a method for formulating a plant nutrition is provided. The method includes steps of providing a biopulp of a fiber plant, filtrating said biopulp for preparing a filtrate and formulating the filtrate for preparing the plant nutrition.

Preferably, the biopulp is provided by steps of providing a culture solution with a culture medium, a fiber plant and a suspension of a microorganism, and fermenting the culture solution for preparing the biopulp.

Preferably, the fiber plant is a non-woody fiber plant.

In accordance with another aspect of the present invention a formulated plant nutrition is provided. The plant nutrition includes a filtrate of a biopulp of a non-woody fiber plant, a nitrogen source, an alcohol and a Hoagland's solution.

Preferably, the plant nutrition further includes a polymer.

Preferably, the polymer is one selected from a group consisting of a seaweed powder, an alginic acid, an alginic salt, a polyelectrolyte, a corn wheat bran and a starch.

Preferably, when the filtrate is 100 parts by volume, the polymer is added therein by a volume of 0.1~5 parts, the nitrogen source is added therein by a volume of 0.01~1 parts, the alcohol is added therein by a volume of 0.1~5 parts and the Hoagland's solution is added therein by a volume of 0.1~5 parts.

Preferably, the nitrogen source is a urea.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
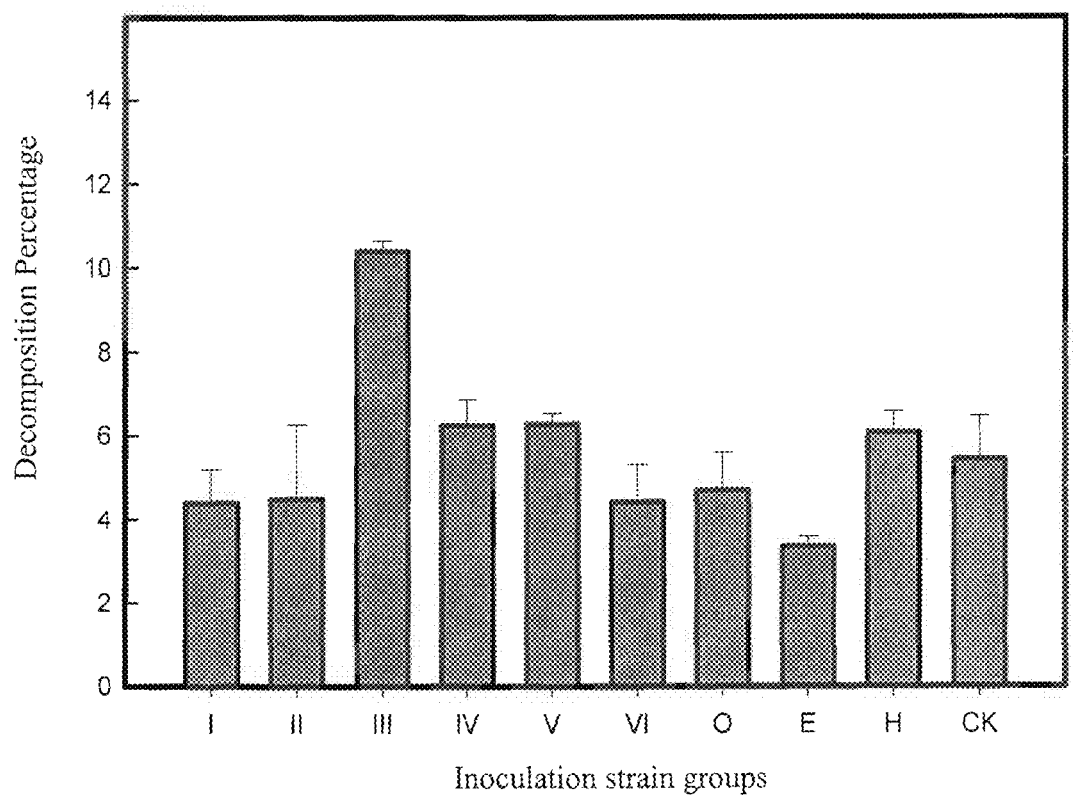
FIG. 1 shows the ability of various strains to decompose the rice straw of Japonica rice.

The present invention will now be described more specifically with reference to the following embodiments. The present invention is to provide a plant nutrition formulated from the recovery filtrate of the biopulp of the waste rice straws. The material is waste rice straw. The detail steps are as follows.

(A) The preparation of waste rice straws for testing:

The waste rice straws of an Indica rice (*Oryza sativa* L. subsp. indica) and Japonica rice are provided. The variety of the Indica rice is Taichung Sheng No. 10 and that of the Japonica rice is Tai Keng No. 9. The rice straws are sun-dried, cut into small segments of 2-3 cm length and pretreated in different ways. The detail steps are described as follows. The waste rice straws are pretreated by an autoclaved treatment (121° C., 15 lb/in$^2$ for 15 minutes), a steamed treatment under relatively high temperature (100° C. for 60 minutes), a boiled treatment under a relatively high temperature (100° C. for 30 minutes), or a soaked treatment under room temperature (25~30° C. for 30 minutes) respectively.

(B) The selection of bacterial strains having decomposition ability:

The microorganism strains are obtained by the following method according to a preferred embodiment. First, 10 g of the rice straws and 10 g of livestock excrements are prepared and added into 90 ml of sterile water containing agar (0.1%, w/v). The materials are well mixed and a serious dilution is made. Then, 0.1 ml of 10$^3$ X and 10$^4$ X diluted solution are uniformly spread on Nutrient Agar plate, pH 8 (NA, purchased Nutrient Agar from Difco company) and Potato Dextrose Agar plate, pH 8 (PDA, purchased Potato Dextrose Agar from Difco company) respectively. Next, the plates are placed in the incubators under 30° C. and 50° C. for 24 hours and 48 hours respectively. Single colonies grown on plates are picked and isolated for obtaining the microorganism strains. The number of microorganisms isolated from the rice straws and the livestock excrements having the decomposition ability is more than 200 strains. Finally, the microorganisms are identified by the Gram stain. It is found that most of the microorganisms are Gram-positive bacteria.

The isolated microorganisms are further selected by the following steps for selecting the microorganism strains having the decomposition ability for rice straws. (1) 19 strains of the isolated strains, named PMBP-m1, PMBP-m2, PMBP-m3, PMBP-m4, PMBP-m5, PMBP-m6, PMBP-m7, PMBP-O1, PMBP-O2, PMBP-O3, PMBP-O4, PMBP-e1, PMBP-e2, PMBP-e3, PMBP-e4, PMBP-H1, PMBP-H2, PMBP-H3 and PMBP-H4 (as shown in Table 1), are divided into 9 strains groups, including PMBP-I, PMBP-II, PMBP-III, PMBP-IV, PMBP-V, PMBP-VI, PMBP-O, PMBP-E and PMBP-H. Please refer to Table 1, which shows the bacterial strains of different strain groups and the characteristics thereof. (2) The strains groups are cultured with NA plates respectively and then a suspension of microorganism is prepared at the concentration of 10$^8$ cfu/ml. (3) 100 ml of solution containing rice straws of Japonica rice (5%, w/v) is prepared. (4) 1 ml of the microorganism suspension is added into the sterile solution prepared in step (3) and then cultured under 50° C. and 200 rpm shaking for a week. Each strain is set up in duplicate. (5) The decomposition percentage of rice straws is calculated.

TABLE 1

| | Characteristics | | |
|---|---|---|---|
| Isolate | Temp. 50° C. | pH 8 | Gram stain (+/−) |
| PMBP-m1 | ++ | + | + |
| PMBP-m2 | ++ | + | + |
| PMBP-m3 | ++ | + | + |
| PMBP-m4 | ++ | + | + |
| PMBP-m5 | ++ | + | + |
| PMBP-m6 | ++ | + | + |
| PMBP-m7 | ++ | + | + |
| PMBP-O1 | ++ | + | + |
| PMBP-O2 | ++ | + | + |
| PMBP-O3 | ++ | + | + |
| PMBP-O4 | ++ | + | + |
| PMBP-e1 | ++ | + | + |
| PMBP-e2 | ++ | + | + |
| PMBP-e3 | ++ | + | + |
| PMBP-e4 | ++ | + | + |
| PMBP-H1 | ++ | + | + |
| PMBP-H2 | ++ | + | + |
| PMBP-H3 | ++ | + | + |
| PMBP-H4 | ++ | + | + |

Please refer to FIG. 1, which shows the ability of various strains to decompose the rice straw of Japonica Rice. The Japonica rice straws treated with shaking culturing for a week are classified, dried and weighted. The decomposition percentage of rice straws treated with different microorganisms is calculated by the following formula.

$$\text{Decomposition \%} = \frac{\left(\begin{array}{c}\text{Total dry weight of fermentative rice straws} - \\ \text{Dry weight of intact rice straws}\end{array}\right)}{\text{(Total dry weight of fermentative rice straws)}} \times 100$$

As shown in FIG. 1, the PMBIII strain group has the best decomposition ability than the others. The decomposition percentage of rice straws is about 10.38%. The PMBIII consists of *Bacillus licheniformis* (PMBP-m5) (Patent Deposit Designation: PTA-5824, deposited on Feb. 18, 2004 with the American Type Culture Center, Manassas, Va. 20110-2209, USA), *B. subtilis* (PMBP-m6) (Patent Deposit Designation: PTA-5818, deposited on Feb. 13, 2004 with the American Type Culture Center, Manassas, Va. 20110-2209, USA), and *B. amyloloquefaciens* (PMBP-m7) (Patent Deposit Designation: PTA-5819, deposited on Feb. 13, 2004 with the American Type Culture Center, Manassas, Va. 20110-2209, USA).

(C) The preparation of culture solution:

An LBY (Lactose Beef extract Yeast extract, LBY) culture medium containing 0.25% (w/v) lactose, 0.2% (w/v) beef extract and 0.05% (w/v) Yeast extract is prepared. The pretreated waste rice straws are added into the LBY culture solution by a ratio of 5% (w/v) respectively. The microorganism suspensions of the PMBPIII strain group are added into the LBY medium at the concentration of $1 \times 10^6$ cfu/ml. And then, the culture solutions are prepared. The PMBPIII strain group consists of *Bacillus licheniformis* (PMBP-m5), *B. subtilis* (PMBP-m6) and *B. amyloloquefaciens* (PMBP-m7) isolated from the waste rice straws or livestock excrements and are Gram-positive bacteria.

(D) Fermentation culturing under continuously shaking:

The culture solutions are incubated at 50° C. and shaked at 200 rpm for a week. And then a biopulp of the waste rice straws are prepared. Each treatment has duplicate treatment.

(E) Filtrating the biopulp of the waste rice straws:

The biopulp of each treatment is screened by a sieve with 270 meshes for preparing a filtrate. The lower part of the filtrate is used for preparing the pulp fiber for papermaking. The upper part of the filtrate is recovered to formulate the plant nutrition.

(F) The dilution of the filtrate for formulating a plant nutrition solution:

The recovery filtrate is diluted with sterile water by a volume of 50 times for preparing a plant nutrition solution.

(G) The application of the plant nutrition solution to the crop cultivation:

The lettuce seeds are immersed in the plant nutrition solution for 2 days and then planted in 5-inch-diameter pots. And then each time 100 ml of plant nutrition solution is applied to each treatment per week respectively. The effects of the plant nutrition of each treatment on the growth of the lettuce seedlings are examined after four weeks.

Additionally, serial dilutions of 10, 25, 50 and 100 times of the recovery filtrates are prepared. The diluted filtrates are applied to the germinated cucumber seeds one time per week for three times. The growths of the cucumber seedlings are examined after 21 days.

(H) The improvement of the plant nutrition solution:

0.3% (w/v) seaweed powder (a kind of polymer), 0.1% (w/v) urea, 1% (v/v) alcohol, and 2% (v/v) Hoagland's solution (The Hoagland's solution contains 0.6 g copper sulfate, 0.11 g ferric sulfate, 0.79 g manganese chloride and 0.15 g zinc sulfate per liter.) are added into the foregoing recovery filtrate of waste rice straw for formulating the RSL plant nutrition solution. The seaweed powder is a kind of polymer. The other kinds of polymer can be used, for example, alginic acid, an alginic salt and polyelectrolytes, etc. Also, the corn wheat bran or starch can be used to replace the polymer.

(I) The application of the RSL plant nutrition solution to the crop cultivation:

Serial dilutions of 250, 500, 750 and 1000 times of the RSL plant nutrition solution are prepared. The diluted RSL plant nutrition solution is applied to the germinated cucumber seeds one time per week for three times. The growths of the cucumber seedlings are examined after 21 days.

Figure 2:
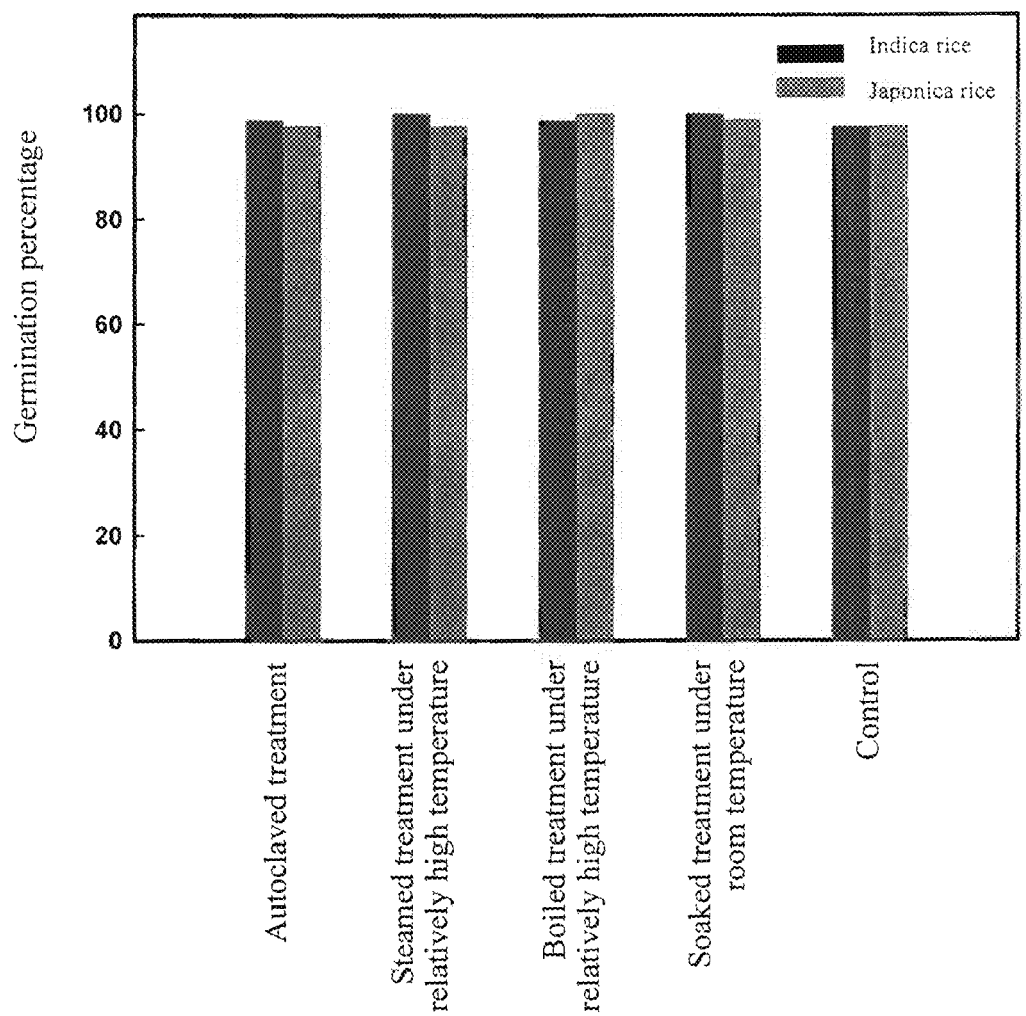
FIG. 2 shows the effects of the biopulp filtrates at 50-fold dilution on the germination of lettuce seeds according to a preferred embodiment of the present invention.

The effects of the plant nutrition solutions formulated from different treatments of waste rice straws on the plant growths are described as follows. Please refer to FIG. 2, which shows the effects of the biopulp filtrates at 50-fold dilution on the germination of lettuce seeds according to a preferred embodiment of the present invention. The germination percentages of different treatments are between 97% and 100%. The germinations of the lettuce seeds are not inhibited or harmed by the plant nutrition solutions. The roots of the lettuce seedlings are not unusual and the root hairs grow vigorously.

Figure 3:
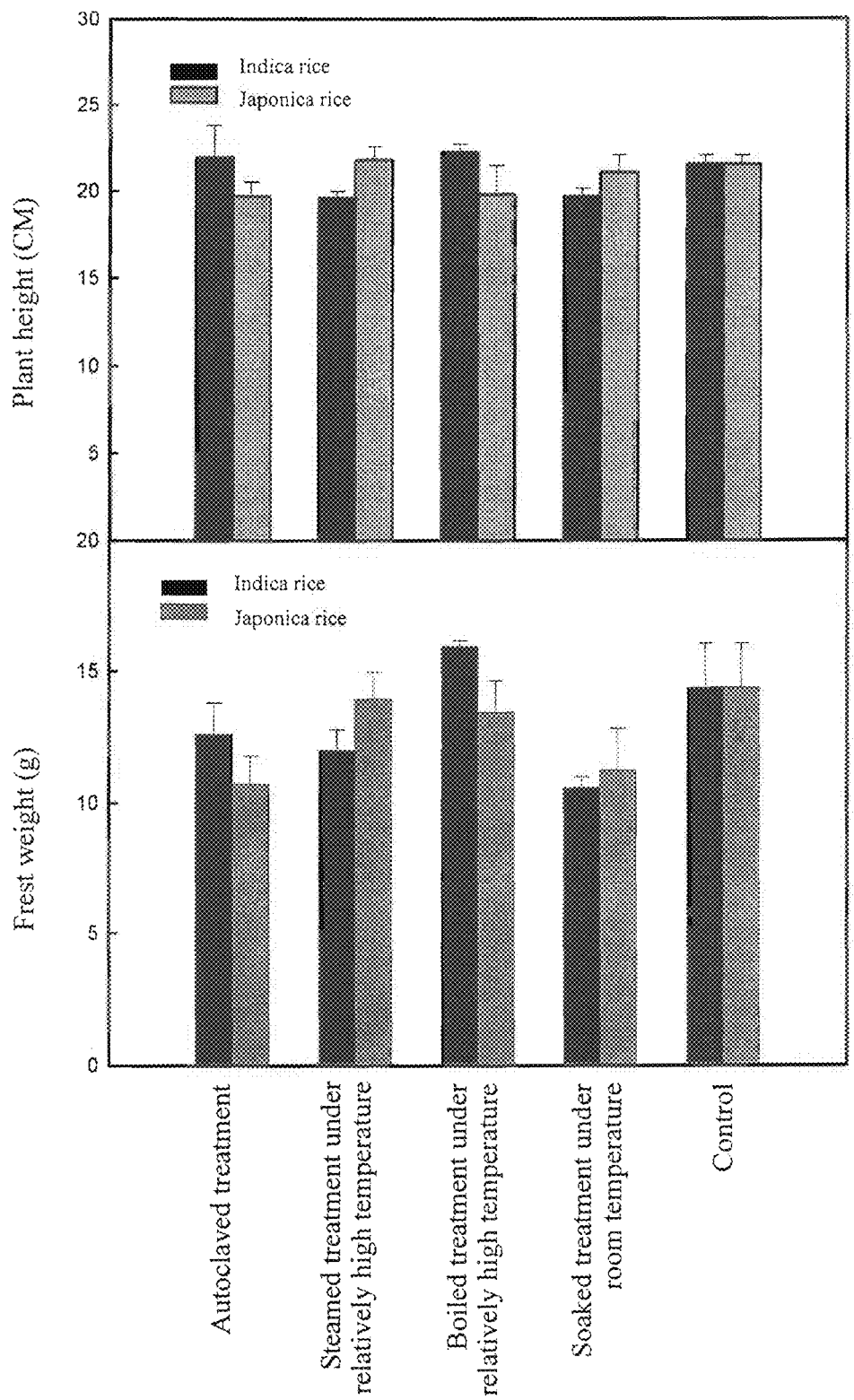
FIG. 3 shows the effects of the biopulp filtrates at 50-fold dilution on the growth of lettuce according to a preferred embodiment of the present invention.
Figure 4:
FIG. 4 shows the effects of the biopulp filtrates at 50-fold dilution on the growth of lettuce according to a preferred embodiment of the present invention.

Please refer to FIG. 3, which shows the effects of the biopulp filtrates at 50-fold dilution on the growth of lettuce according to a preferred embodiment of the present invention. The filtrates of different pretreated waste rice straws do not affect the plant heights and fresh weights of lettuce seedlings. The filtrate obtained from the of waste rice straws treated by boiled treatment has the effect of enhancing the growths of lettuce seedlings, especially, the filtrate obtained from the Indica rice (FIG. 4).

Figure 5:
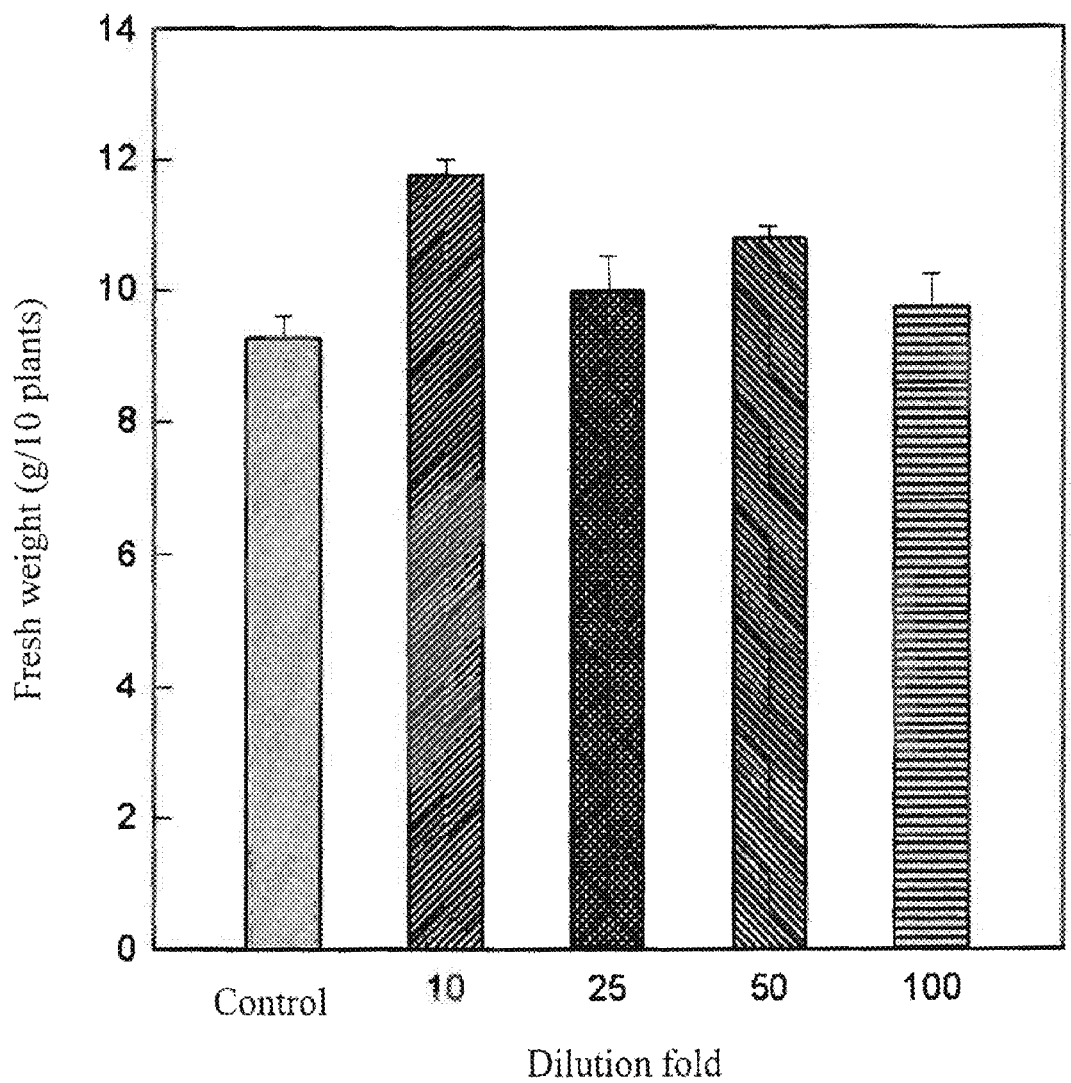
FIG. 5 shows the effects of the biopulp filtrates of different dilution folds on the growth of cucumber seedlings according to a preferred embodiment of the present invention.

According to another preferred embodiment, the PMBPIII strain group consists of *Bacillus licheniformis* (PMBP-m5), *B. subtilis* (PMBP-m6) and *B. amyloloquefaciens* (PMBP-m7) are inoculated into the LBY culture medium containing 5% (w/v) waste rice straws. The waste rice straws of an Indica rice (*Oryza sativa* L. subsp. indica) are provided. The variety of the Indica rice is Taichung Sheng No. 10. The rice straws are sun-dried, cut into small segments of 2-3 cm length. The inoculation concentration of the PMBPIII strain group is $1 \times 10^6$ cfu/ml. The culture solutions are incubated and fermented at 50° C. and shaked at 200 rpm for four days. And then, 1% (w/v) CaO is added into the solution. The solution is heated up to 140° C. for 30 minutes for preparing a biopulp solution. The biopulp solution is screened by a sieve with 270 meshes for preparing a biopulp filtrate. The biopulp filtrate is diluted with sterile water for serial dilutions of 10, 25, 50 and 100 times. The diluted filtrates are applied to the germinated cucumber seeds one time per week for three times. The growths of the cucumber seedlings are examined after 21 days. The growths of the lettuce seedlings are not inhibited or harmed by the plant nutrition solutions. The plant nutrition solutions have somewhat effects on enhancing the seedling developments and mitigating the disease of powdery mildew. Please refer to FIG. 5, which shows the effects of the biopulp filtrates of different dilution folds on the growths of cucumber seedlings according to a preferred embodiment of the present invention. The fresh weights of the cucumber seedlings treated with the plant nutrition solutions formulated from the biopulp filtrate are better than that of the control. The roots grow well. And the plant nutrition treatment can help the plants to stand erectly.

According to another preferred embodiment, the filtrate produced by the biopulp of waste rice straws can be improved by adding some additives. Four additives including 0.3% (w/v) seaweed powder, 0.1% (w/v) urea, 1% (v/v) alcohol and 2% (v/v) Hoagland's solution are added into the recovery filtrate of the biopulp of waste rice straws for formulating a RSL plant nutrition solution. The Hoagland's solution contains 0.6 g copper sulfate, 0.11 g ferric sulfate, 0.79 g manganese chloride and 0.15 g zinc sulfate per liter. The RSL plant nutrition is diluted with the sterile water for making serial dilutions of 250, 500, 750 and 1000 times. The different diluted plant nutrition solutions are respectively applied to the germinated cucumber seeds one time per week. The growths of cucumber seedlings are examined after 21 days.

Figure 6:
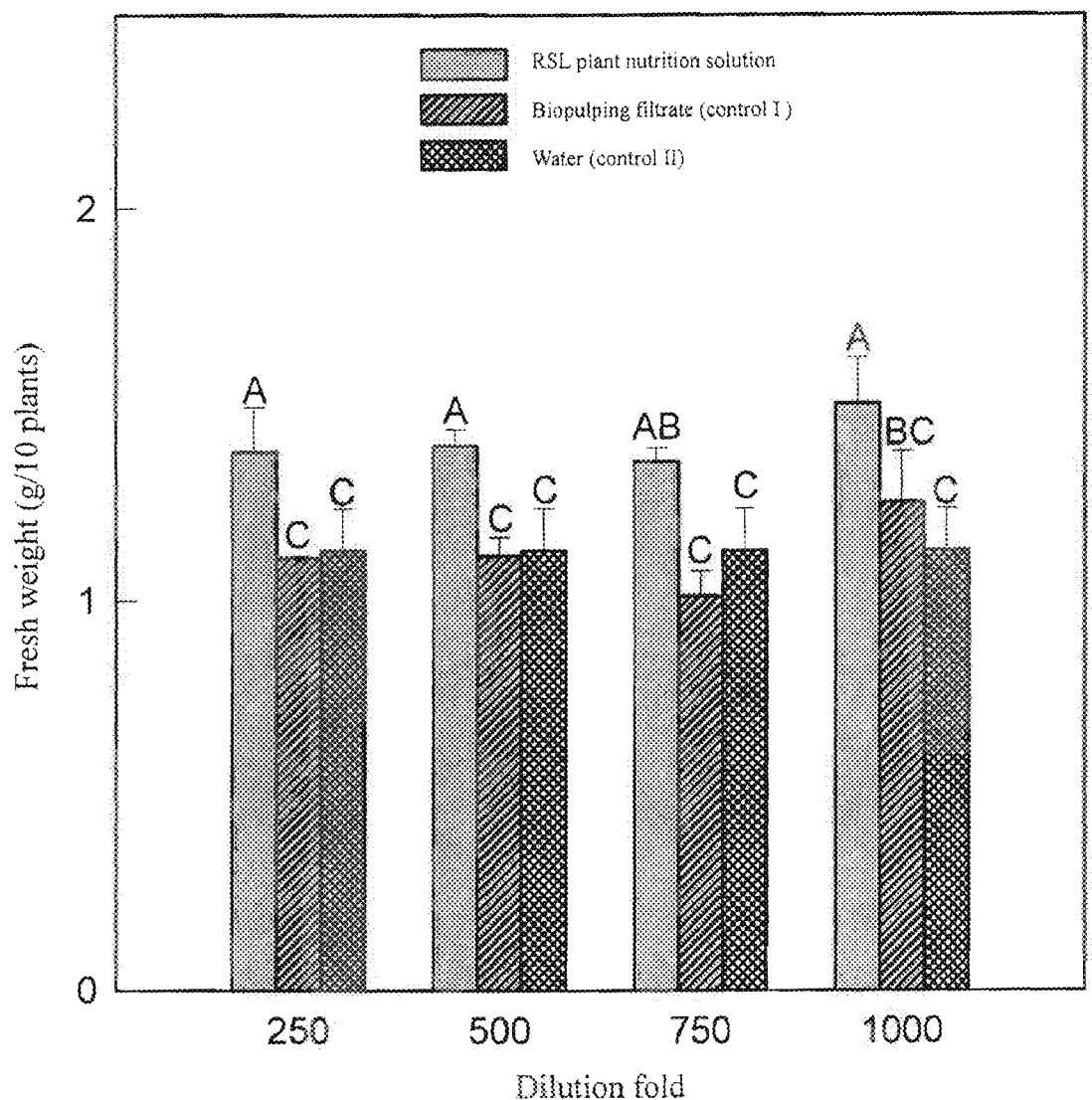
FIG. 6 shows the effects of different RSL plant nutrition concentrations on the growth of cucumber seedlings according to a preferred embodiment of the present invention.
Figure 7:
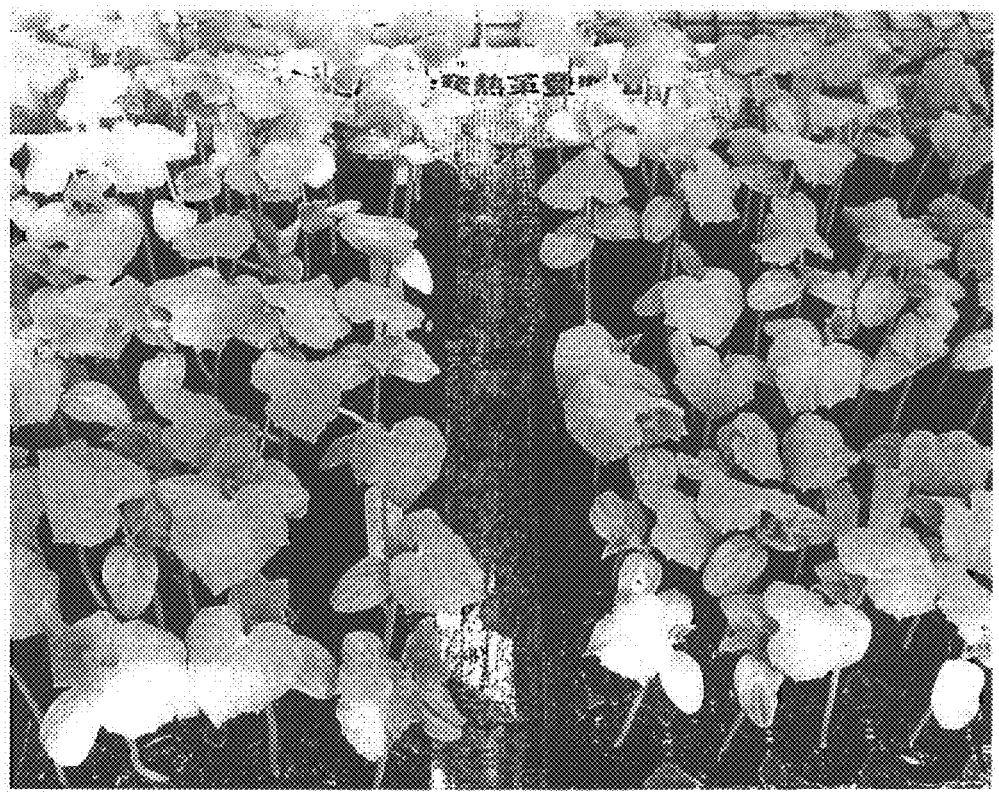
FIG. 7 shows the information about the growth of cucumber seedlings after being treated with RSL plant nutrition three times according to a preferred embodiment of the present invention.
Figure 7:
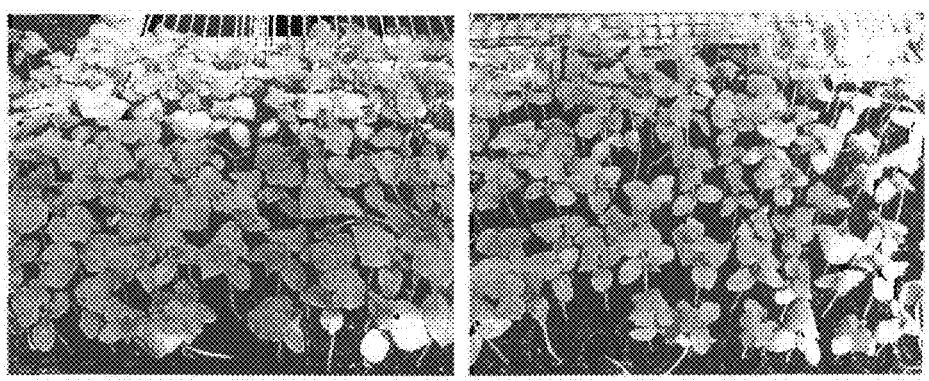

Please refer to FIG. 6 and FIG. 7. FIG. 6 shows the effects of different RSL plant nutrition concentrations on the growth of cucumber seedlings according to a preferred embodiment of the present invention. The results reveal that the growths of cucumber seedlings are enhanced by the RSL plant nutrition solutions. The effects on the growths of cucumber seedlings of RSL plant nutrition solutions are better than those of the control I (plant nutrition directly formulated from the biopulp filtrate) and the control II (water treatment). FIG. 7 shows the information about the growth of cucumber seedlings after being treated with RSL plant nutrition three times according to a preferred embodiment of the present invention. The fresh weights of the cucumber seedlings are better than the other treatments. The whole plants and leaves are taller and larger and the disease of powdery mildew is mitigated for the cucumber.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A formulated plant nutrition, comprising:
    a filtrate of a biopulp of a non-woody fiber plant;
    a nitrogen source;
    an alcohol; and
    a Hoagland's solution.

2. The formulated plant nutrition as claimed in claim 1 further comprising a polymer.

3. The formulated plant nutrition as claimed in claim 2, wherein the polymer is one selected from a group consisting of a seaweed powder, an alginic acid, an alginic salt, a polyelectrolyte, a corn wheat bran and a starch.

4. The formulated plant nutrition as claimed in claim 2, wherein when the filtrate is 100 parts by volume, the polymer is added therein by a volume of 0.1~5 parts, the nitrogen source is added therein by a volume of 0.01~1 parts, the alcohol is added therein by a volume of 0.1~5 parts, and the Hoagland's solution is added therein by a volume of 0.1~5 parts.

5. The formulated plant nutrition as claimed in claim 1, wherein the nitrogen source is a urea.

\* \* \* \* \*